(12) United States Patent
Wirthlin

(10) Patent No.: US 7,259,383 B2
(45) Date of Patent: Aug. 21, 2007

(54) OPTICAL TRANSDUCER FOR DETECTING LIQUID LEVEL

(75) Inventor: Alvin R. Wirthlin, Lucas, TX (US)

(73) Assignee: Opti Sensor Systems, LLC, Lancaster, VA (US)

( * ) Notice: Subject to any disclaimer, the term of this patent is extended or adjusted under 35 U.S.C. 154(b) by 555 days.

(21) Appl. No.: 10/829,772

(22) Filed: Apr. 22, 2004

(65) Prior Publication Data
US 2005/0236591 A1  Oct. 27, 2005

(51) Int. Cl.
G01N 15/06 (2006.01)
G01N 21/49 (2006.01)
G01N 21/85 (2006.01)
G01J 1/04 (2006.01)
G01J 1/42 (2006.01)
G01J 5/08 (2006.01)

(52) U.S. Cl. .............. 250/573; 250/227.11; 250/577; 356/627; 385/13

(58) Field of Classification Search ........... 250/573, 250/577, 227.11; 356/137, 627; 385/12–13; 73/293; 83/1.73; 340/619
See application file for complete search history.

(56) References Cited

U.S. PATENT DOCUMENTS

| | | |
|---|---|---|
| 1,883,971 A | 10/1932 | Kryzanowsky |
| 3,068,697 A | 12/1962 | Carlson |
| 3,338,457 A | 8/1967 | Tygenhof |
| 3,442,127 A | 5/1969 | Nichols |
| 3,448,616 A | 6/1969 | Wostl et al. |
| 3,528,291 A | 9/1970 | Melone |
| 3,535,934 A | 10/1970 | Rapata |
| 3,648,521 A | 3/1972 | Amendolia |
| 3,796,098 A | 3/1974 | Traver |
| 3,834,235 A | 9/1974 | Bouton et al. |
| 4,132,899 A | 1/1979 | Shigemasa et al. |
| 4,242,590 A | 12/1980 | von Tluck |
| 4,246,489 A | 1/1981 | Yoshida et al. |
| 4,354,180 A | 10/1982 | Harding |
| 4,606,226 A | 8/1986 | Krohn |
| 4,713,552 A * | 12/1987 | Denis et al. ............... 250/577 |
| 4,764,671 A | 8/1988 | Park |
| 4,809,551 A * | 3/1989 | Grossiord ................... 73/327 |
| 4,840,137 A * | 6/1989 | Beauvais et al. ........... 116/227 |
| 4,961,069 A | 10/1990 | Tsaprazis |
| 4,962,395 A | 10/1990 | Baird |
| 5,029,471 A | 7/1991 | Goodrich |
| 5,278,426 A | 1/1994 | Barbier |
| 5,279,157 A | 1/1994 | Mattis et al. |
| 5,534,708 A | 7/1996 | Ellinger et al. |

(Continued)

Primary Examiner—Georgia Epps
Assistant Examiner—Patrick J. Lee
(74) Attorney, Agent, or Firm—Alvin R. Wirthlin

(57) ABSTRACT

An optical transducer for determining the presence or absence of liquid or the like in a reservoir includes a housing with a hollow interior and an optical probe that extends through the housing. The optical probe has a central axis, a proximal end positioned in the hollow interior and a distal end positioned outside of the housing. The distal end has first and second measurement surfaces that intersect at a transverse edge. The transverse edge extends at an acute angle with respect to the central axis. A light source is arranged for projecting radiant energy into the optical probe toward the distal end. A photosensor is arranged for detecting radiant energy reflected from the distal end to thereby detect the presence and absence of liquid on the optical probe.

23 Claims, 4 Drawing Sheets

U.S. PATENT DOCUMENTS 6,447,573 B1 * 9/2002 Rake .............................. 95/10
6,448,573 B1    9/2002 Benton
6,555,837 B2    4/2003 Benton
7,142,306 B2 * 11/2006 Wu et al. ................... 356/436

* cited by examiner

OPTICAL TRANSDUCER FOR DETECTING LIQUID LEVEL

BACKGROUND OF THE INVENTION

This invention relates to optical transducers, and more particularly to optical transducers for detecting liquid level and the like.

FIGS. 1A-1C schematically depict a prior art optical transducer 10 for determining liquid level in tanks, vessels or the like. As shown, the transducer 10 includes an optical body 12 with a conical tip 14 at one end thereof, and a light source 16 and photosensor 18 at an opposite end thereof. In the absence of liquid as shown in FIG. 1A, light from the light source 16 is normally projected through the optical body 12 where it is internally reflected at a conical measuring surface 20 of the conical tip 14 and returns to the photosensor 18, as represented by arrow 22. When the conical tip 14 is submerged in liquid, as represented by dashed line 24 in FIG. 1B, the light is refracted out of the conical tip 14 and into the liquid (arrow 26). The amount of light at the photosensor 18 is thus significantly diminished. The presence or absence of liquid on the transducer 10, and thus the level of liquid in a tank, vessel or the like can be ascertained.

However, it has been found that liquid level transducers of above-described type can produce erroneous signals. As shown in FIG. 1C, when the liquid 24 descends to a level below the transducer 10, one or more liquid droplets 28 may form on the conical measuring surface 20 due to the surface tension of the liquid and the surface energy of the surface 20. Consequently, light is refracted out of the conical tip 14 and into the droplet(s) 28, as shown by arrow 26, to thereby give a false liquid level indication. This phenomena can occur whether the transducer 10 is in the horizontal position as shown, or in the vertical position.

In addition to the above, it has previously been difficult to construct a compact optical transducer that is capable of operating through a wide temperature range due to the relative proximity of the light source and photosensor to the liquid being measured.

BRIEF SUMMARY OF THE INVENTION

According to one aspect of the invention, an optical probe for a liquid level transducer comprises an elongate, transparent body having a central axis, a first end for receiving radiant energy from a light source and a second end adapted for exposure to a liquid to be measured. The second end has first and second measurement surfaces that intersect at a transverse edge. The transverse edge extends at an acute angle with respect to the central axis to thereby form a probe tip. In this manner, liquid droplets that may be present on the probe are directed along the transverse edge toward the probe tip for expulsion therefrom.

According to a further aspect of the invention, an optical transducer for determining the presence or absence of liquid in a reservoir comprises a housing with a hollow interior and an optical probe that extends through the housing. The optical probe has a central axis, a proximal end positioned in the hollow interior and a distal end positioned outside of the housing. The distal end has first and second measurement surfaces that intersect at a transverse edge. The transverse edge extends at an acute angle with respect to the central axis. A light source is arranged for projecting radiant energy into the optical probe toward the distal end. A photosensor is arranged for detecting radiant energy reflected from the distal end to thereby detect the presence and absence of liquid on the optical probe.

According to yet a further aspect of the invention, an optical transducer for determining the presence or absence of liquid in a reservoir comprises a housing with a hollow interior and a mounting section with external threads for engagement with internal threads of a reservoir. The optical transducer also comprises an optical probe that extends through the housing with a proximal end of the optical probe being positioned in the hollow interior above the mounting section and a distal end of the optical probe being positioned outside of the housing below the mounting section. It will be understood that terms of position and/or orientation as may be used throughout the specification and claims, such as "above" and "below" refer to relative, rather than absolute positions and/or orientations. A light source is positioned in the hollow interior above the proximal end for projecting radiant energy into the optical probe toward the distal end. A photosensor is also positioned in the hollow interior above the proximal end for detecting radiant energy reflected from the distal end to thereby detect the presence and absence of liquid on the optical probe. In this manner, heat transfer between liquid in the reservoir and the light source and photosensor is minimized.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein.

It is noted that the drawings are intended to depict only typical embodiments of the invention and therefore should not be considered as limiting the scope thereof. It is further noted that the drawings may not be necessarily to scale. The invention will now be described in greater detail with reference to the accompanying drawings.

DETAILED DESCRIPTION OF THE INVENTION

Figure 1A:
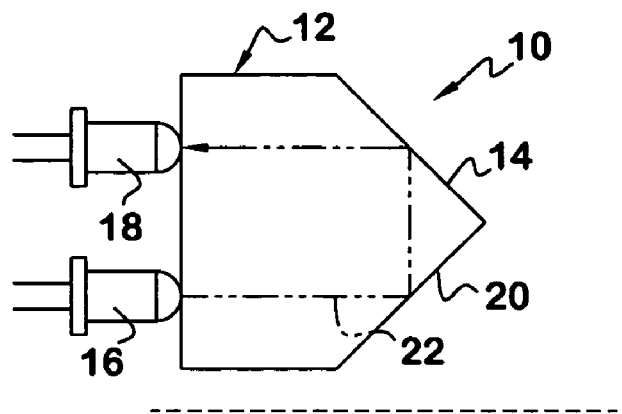
FIG. 1A is a schematic view of a prior art optical liquid level transducer in a first operating condition.
Figure 1B:
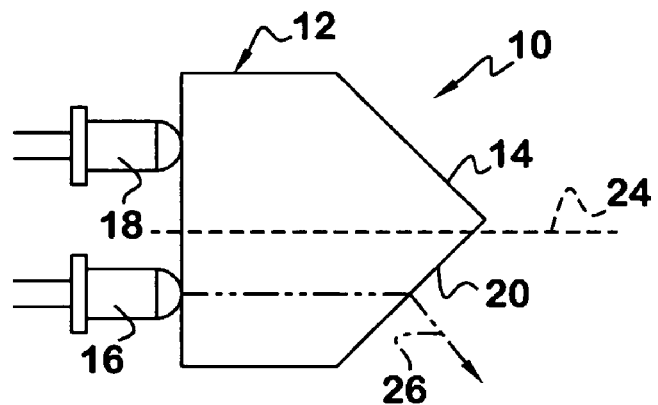
FIG. 1B is a view similar to FIG. 1 of the prior art optical liquid level transducer in a second operating condition.
Figure 1C:
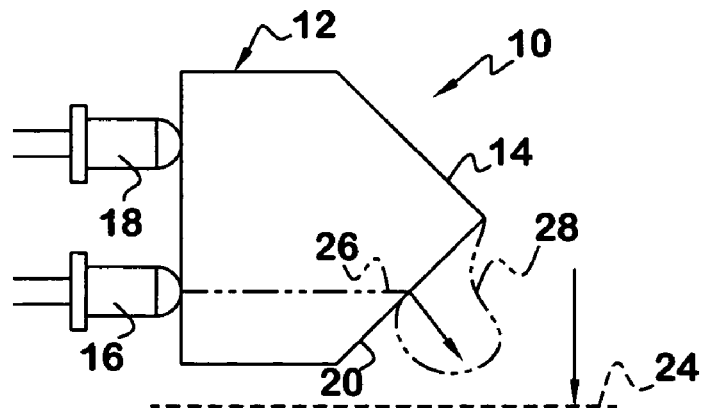
FIG. 1C is a view similar to FIG. 1 of the prior art optical liquid level transducer in a failure condition.
Figure 2:
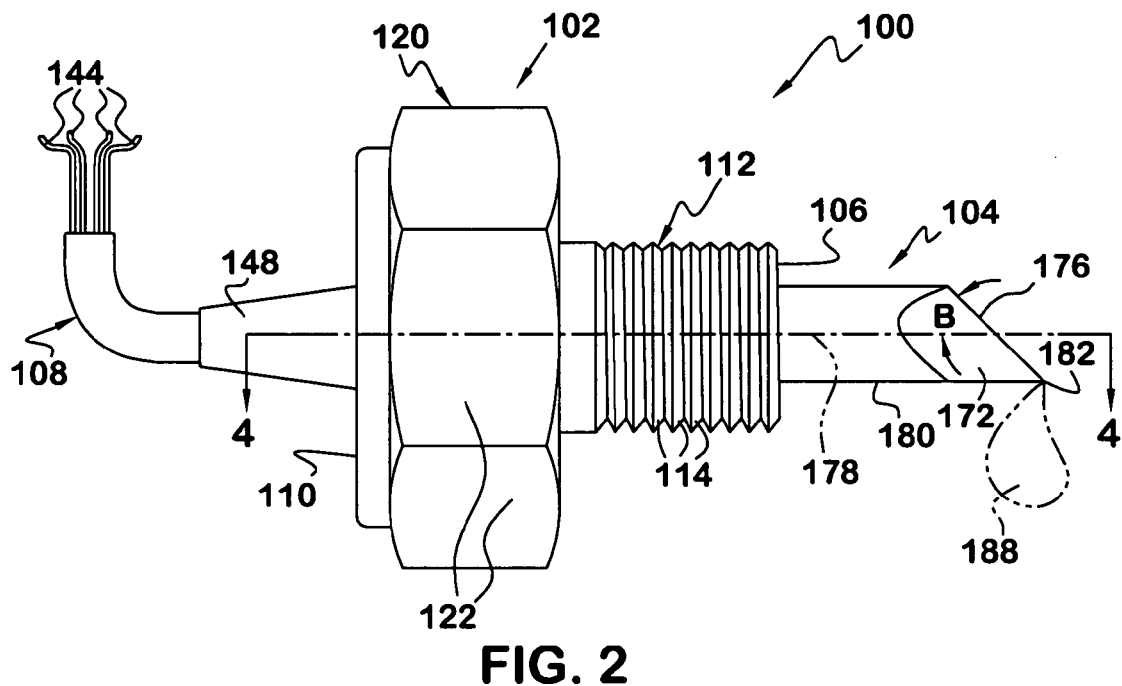
FIG. 2 is a side elevational view of an optical liquid level transducer in accordance with the invention.
Figure 3:
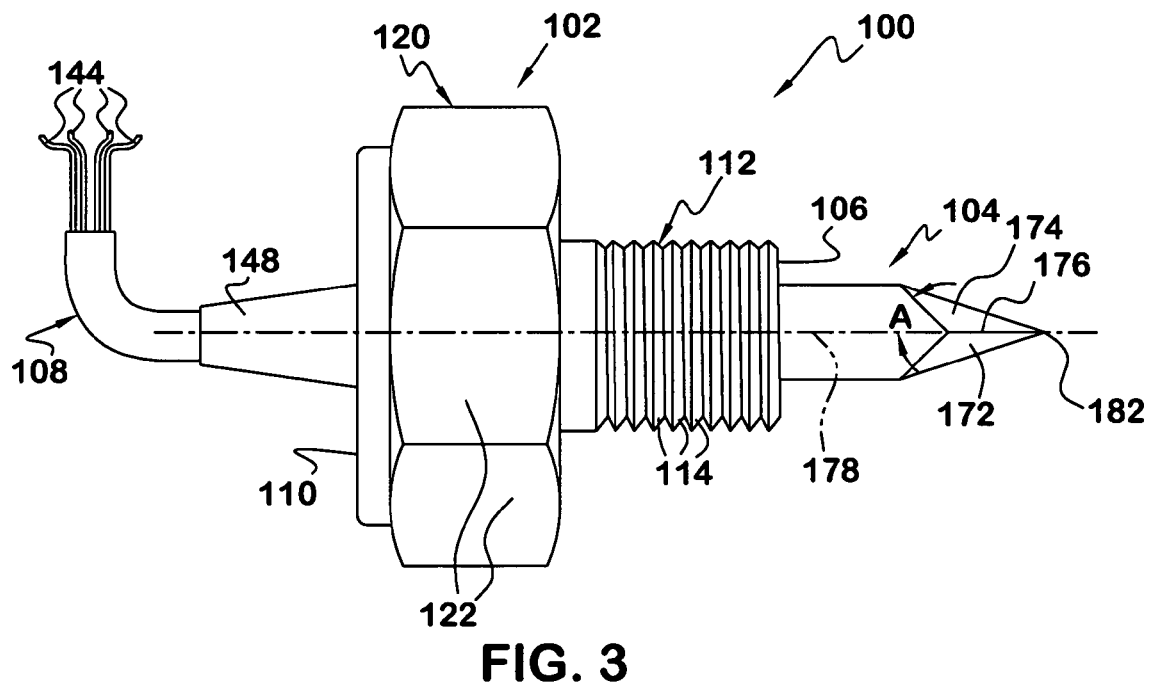
FIG. 3 is a top plan view of the optical liquid level transducer of FIG. 2.

Referring to the drawings and to FIGS. 2 and 3 in particular, an optical liquid level transducer 100 in accordance with the present invention is illustrated. The optical transducer 100 preferably includes a housing 102, an optical probe 104 extending from a distal end 106 of the housing 102, and a wiring harness 108 extending from an opposite proximal end 110 of the housing.

Figure 4:
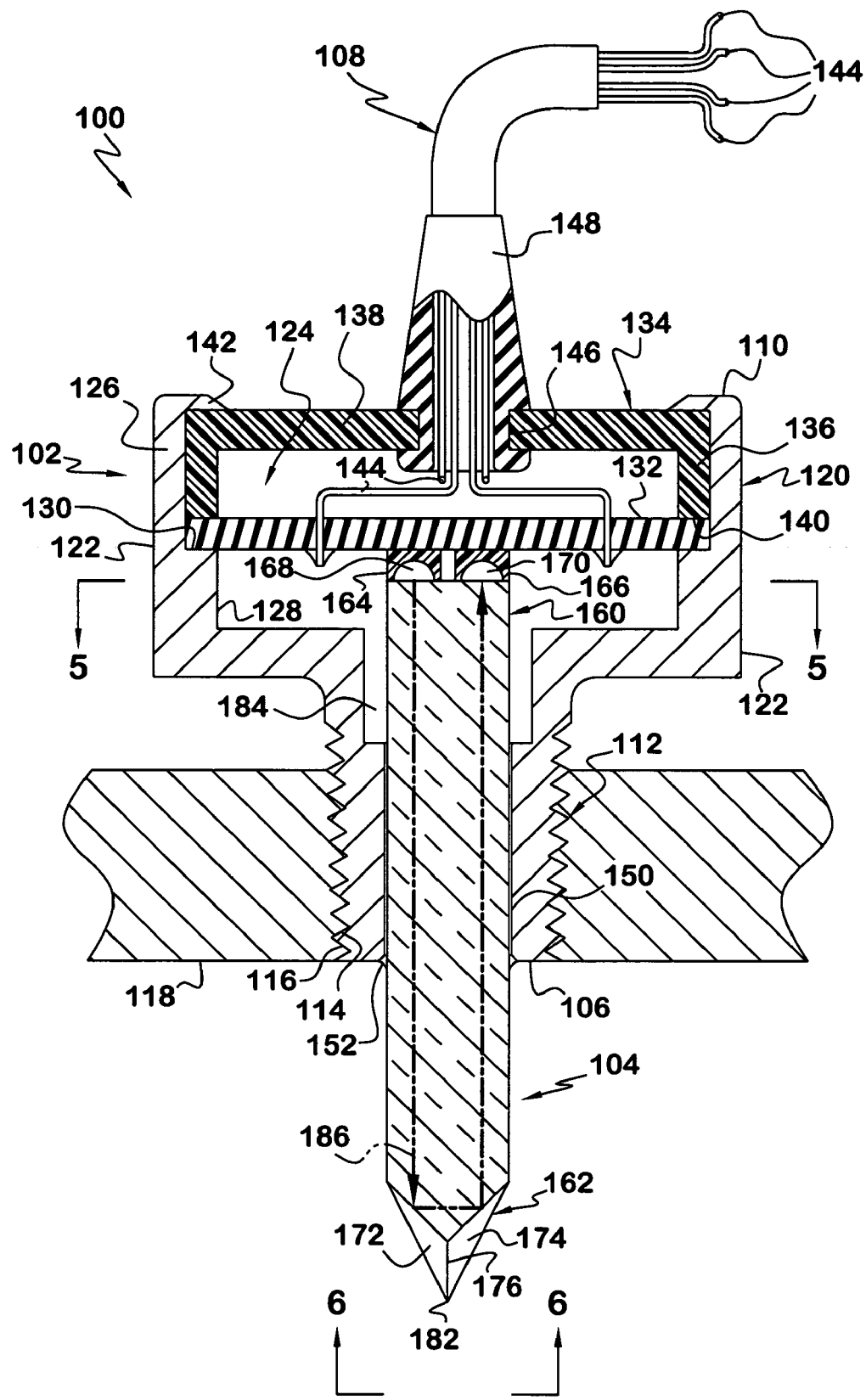
FIG. 4 is a sectional view of the optical liquid level transducer taken along line 4-4 of FIG. 2.
Figure 5:
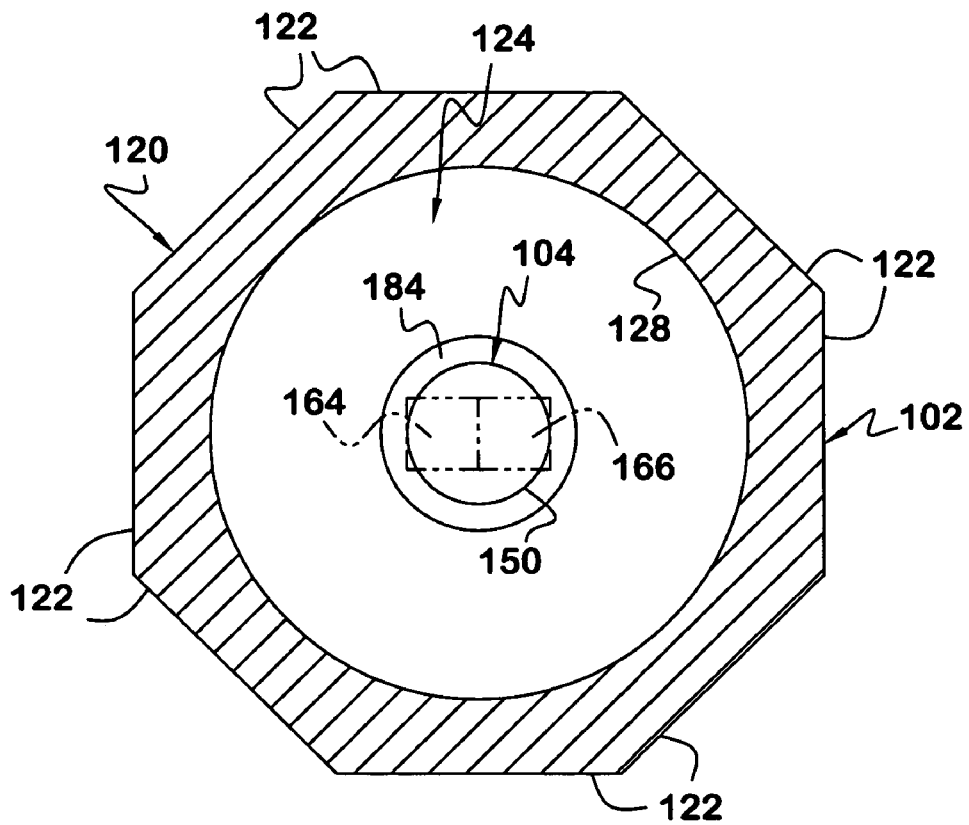
FIG. 5 is a sectional view of the optical liquid level transducer taken along line 5-5 of FIG. 4.
Figure 6:
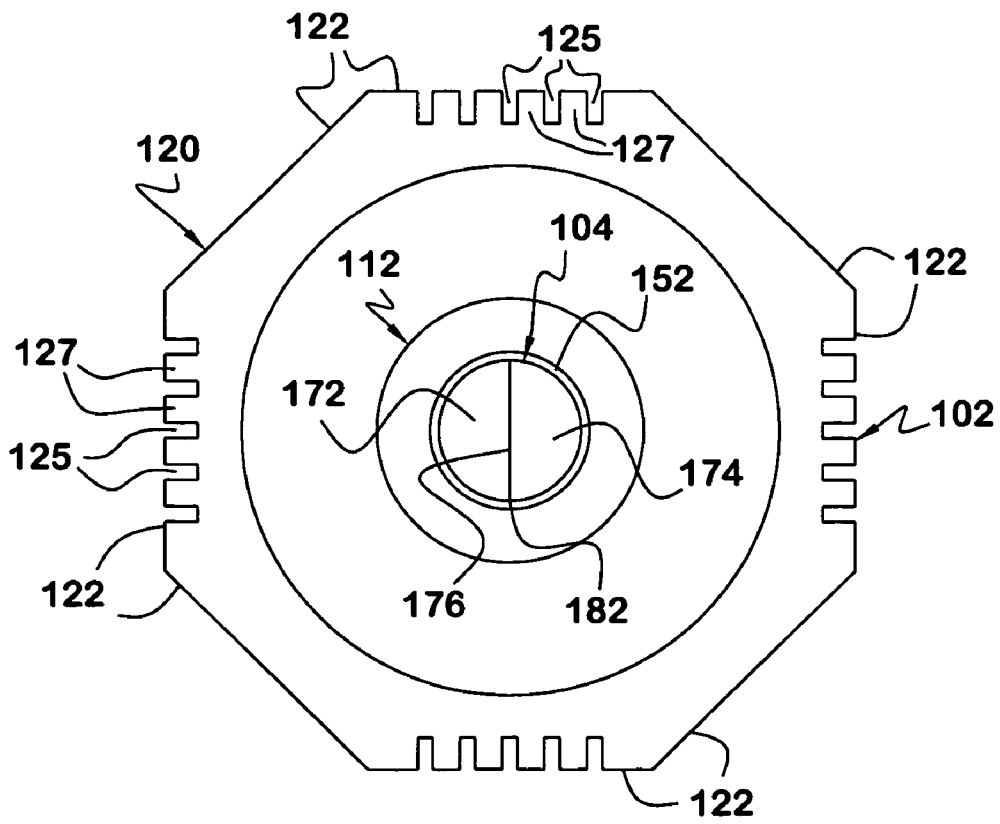
FIG. 6 is an end view of the optical liquid level transducer as seen in the direction of line 6-6 of FIG. 4, in accordance with a further embodiment of the invention.

With additional reference to FIGS. 4 and 5-6, the housing 102 is preferably constructed of a metal material, such as brass. The housing 102 includes a mounting section 112 with external threads 114 for engagement with internal threads 116 of a reservoir housing 118, which may be in the form of a tank, vessel, container or the like. The housing 102 also preferably includes a securing section 120 with generally flat, external faces 122 for engagement by a wrench or the like (not shown) for installing and removing the optical liquid level transducer 100 with respect to the reservoir housing 118 in a well-known manner. It will be understood that the housing 102 can be constructed of other materials such as plastic or ceramic. The particular configuration of the housing 102 will largely depend on the mounting arrangement of the reservoir housing 118. Accordingly, the external threads 114 and external faces 122 may be eliminated and other mounting means may be provided. The securing section 120 has a wall 126 with the external faces 122 formed thereon and a generally cylindrical interior cavity 124 delimited by an interior surface 128 of the wall.

In accordance with a further embodiment of the invention as shown in FIG. 6, one or more of the external faces 122 may be provided with cooling grooves 125 and/or fins 127 (FIG. 6) extending generally parallel with a longitudinal axis 178 of the housing. The grooves and/or fins increase the outer surface area of the housing 102 so that heat within the housing 102 can be more efficiently transferred to the outside environment. In this manner, the electronics and other components located within the housing may have lower temperature requirements. It will be understood that the grooves and/or fins have any orientation with respect to the central axis 178.

An annular step 130 is formed in the interior surface 128 for supporting a circuit board 132 within the cavity 124. An end cap 134 has an annular side wall portion 136 and a plate or disk portion 138 connected to the side wall portion. The annular side wall portion 136 is preferably in sealing engagement with the interior surface 128 of the wall 126. An end 140 of the annular side wall portion 136 opposite the disk portion 138 abuts the circuit board 132 and holds it in place against the annular step 130. An annular flange 142 of the wall 126 can be pressed, rolled or otherwise deformed over the plate portion 138 to hold the end cap and circuit board in the interior cavity 124. It will be understood that other means for holding the components together can be employed, such as adhesive, welding, heat staking, and so on.

Electrical wires 144 from the circuit board 132 exit the housing 102 through a central opening 146 formed in the plate portion 138. A strain relief device 148 may be mounted in the opening 146 with the wires 144 extending therethrough in a well known manner.

In accordance with a further embodiment of the invention, the wires, strain relief device and/or end cap may be replaced with a male or female plug portion with electrical connectors (not shown) for mating with a female or male plug portion (not shown), respectively, of the vehicle or system on which the liquid level transducer 100 is to be installed.

The mounting section 112 has a central bore 150 that, before installation of the optical probe 104, intersects the interior cavity 124. The optical probe 104 extends through the central bore 140 and is preferably sealingly connected to the mounting section 112 at the distal end 106 of the housing 102 through an epoxy adhesive layer 152 or the like to prevent liquid from entering the bore 140 and interior cavity 124. It will be understood that other means for connecting and/or sealing the optical probe to the housing can be used, such as press-fitting the probe in the housing, insert or injection molding the probe directly to the housing, using one or more O-rings between the probe and housing, ultrasonically welding the probe to the housing, using other types of adhesives and sealants, and so on.

The optical probe 104 is preferably in the form of a transparent body of generally elongate cylindrical shape with a proximal end 160 and a distal measurement end 162. However, it will be understood that the optical probe 104 can have other cross dimensional shapes, such as oval, square, triangular, and so on.

It will be understood that the term "transparent" as used herein refers to a material condition that ranges from optically clear to opaque for various wavelengths of radiant energy. By way of example, some materials that allow transmission of a substantial amount of radiant energy in the visible light region of the electromagnetic spectrum may not allow significant transmission of radiant energy in the infrared or other regions. Accordingly, a suitable transparent material would allow the transmission of a measurable amount of radiant energy of a selected wave length through the probe 104. By way of example, the probe 104 can be constructed of glass material such as borosilicate or quartz; Teflon® material such as PTFE, FEP, ETFE; plastic material such as acrylic, nylon, polysulfone, polyetherimide, silicon, polyurethane, polycarbonate, and so on. However, it will be understood that the present invention is not limited to the particular materials described.

The proximal end 160 of the optical probe 104 preferably abuts or is at least closely adjacent to a light source 164 and photosensor 166 mounted on the circuit board 132.

The light source 164 is preferably of the LED type, and both the light source and photosensor can be surface-mount devices with recessed light emitting and light detecting areas 168 and 170, respectively, to both efficiently couple the devices to the optical probe 104 and prevent the direct transmission of stray light from the light source to the photosensor. By way of example, a suitable light source may be a high brightness surface-mount LED, such as Vishay TLM 33 series or TSMS3700. Likewise, a suitable photosensor may be a surface-mount phototransistor, such as Vishay TEMT3700.

A suitable combination light source/photosensor may alternatively be used. One such combination is a reflective object sensor, such as QRD1114 provided by Fairchild Semiconductor. The reflective object sensor includes an integrated infrared LED emitter and a phototransistor in a single package. Preferably, the reflective object sensor abuts the proximal end 160 or is at least closely adjacent thereto.

It will be understood that other light sources can be used, such as, without limitation, incandescent bulbs, laser diodes, or any other source that emits radiant energy in one or more of the visible, ultra-violet, or infra-red spectrums. It will be further understood that other photosensors can be used, such as, without limitation, photocells, photodiodes, and photoconductors. In accordance with yet a further embodiment of the invention, a single integrated unit such as a proximity sensor having both the light source and the photosensor may be used.

It will be further understood that the position of the light source and photosensor may be reversed or located at other positions on the proximal end 160 of the optical probe 104. In addition, the light source and photosensor may be remotely located from the proximal end of the optical probe and positioned for emitting light into the optical probe and receiving light therefrom, respectively, through intermediate members such as fiber optics, transparent rods, or other suitable light guides.

The distal measurement end 162 of the optical probe 104 has a first measurement surface 172 and a second measurement surface 174. The first and second measurement surfaces intersect at a transverse edge 176. Preferably, each measurement surface 172, 174 forms an acute angle A with respect to the central axis 178, as shown in FIG. 3. In addition, the edge 176 preferably forms an acute angle B with respect to the central axis 178, as shown in FIG. 2. The edge 176 together with the outer surface 180 of the probe form a pointed probe apex or tip 182. Preferably, angles A and B are each approximately 45 degrees. It will be understood, however, that angles A and B can vary over a wide range depending on the type of light source used and/or the liquid(s) to be measured. It will be further understood that the probe tip 182 need not be pointed. In addition, more than one edge 176 can be provided with more than two intersecting measurement surfaces.

As best shown in FIGS. 4 and 5, with the optical probe 104 installed in the housing 102, an annular gap 184 is formed in the interior cavity 124 between the housing 102 and the probe 104. The annular gap 184 surrounds the probe 104 and serves as an insulative barrier between the housing and proximal end 160 of the probe. Accordingly, heat transfer between the wall 126 of the housing 102 and the probe 104 occurs by convection through the gap 184 rather than by conduction to thereby limit the temperature of the proximal end 160 of the probe. The temperature of the proximal end 160 can also be controlled through heat conduction with the reservoir housing 118. As shown in FIG. 4, the reservoir housing 118 may serve as a heat sink to draw heat away from the optical probe 104 and the mounting section 112 through conductive heat transfer. If desired, the annular gap 184 and/or a portion of the interior cavity 124 below the circuit board 132 may be filled with insulative material (not shown).

In the absence of liquid, as shown in FIG. 4, light entering the optical probe 104 from the light source 164 is reflected off the measurement surfaces 172, 174 and back into the probe, as represented by arrow 186, so that the photosensor 166 can detect at least a portion of the light emitted by the light source 164. The shape of the optical probe 104 encourages any liquid droplet(s) 188 (shown in phantom line in FIG. 2) that may initially be on the measurement surfaces 172, 174 to be expelled from the optical probe 104. The relatively narrow areas at the edge 176 and tip 182 discourage the adhesion of droplets due to the relatively small surface energy at these locations. Accordingly, the droplets will tend to slide under gravity along the edge 176 toward the probe tip 182 where it is expelled from the optical probe 104. In this manner, at least a substantial area of the measurement surfaces are clear of the droplets, whether the probe is in the horizontal or vertical position. Thus, any liquid that may otherwise remain on the measurement surfaces is at least substantially reduced to thereby give greater measurement reliability over prior art optical liquid level detectors.

In order to further reduce the surface energy of the optical probe 104 and repel liquids, a low surface energy film such as Novec™ provided by 3M or other fluorinated polymer or low surface energy material, can be applied at least to the measurement faces 172, 174 of the probe, and preferably to the entire probe surface that will be exposed to liquid. Another suitable film is a silicone hardcoat, such as PHC587 provided by GE Silicones. The film should have a lower index of refraction than the material of the probe 104 so that in the absence of liquid, light from the light source 164 is reflected back into the probe material. By way of example, an optical probe 104 constructed of polysulfone has a refractive index of approximately 1.63. A Novec™ film covering the polysulfone probe has a refractive index of approximately 1.38, while a silicone hardcoat has a refractive index of approximately 1.42. With such an arrangement, it has been found that the voltage differential of the probe between a dry condition and an immersed condition in water is significantly enhanced. It will be understood that a wide range of materials can be used for both the probe tip and the film.

In the presence of liquid, the light from the light source will be refracted out of the optical probe 104 to thereby create a signal change that can be used to trigger a visual or audio indicator to alert an operator that the liquid level in the reservoir 118 is at a predetermined level. Alternatively, the abrupt signal change can be used to automatically start and/or stop operation of a pump or the like (not shown) to fill the reservoir with liquid to a predetermined level.

Where it is desirous to continuously monitor the high and low level of liquid in a reservoir for automatically filling the reservoir to a predetermined level, two of the optical transducers 100 can be used in conjunction with other circuitry to automatically start and stop operation of a pump at the low level and high level, respectively.

It will be appreciated by those skilled in the art that changes could be made to the embodiments described above without departing from the broad inventive concept thereof. Although the present invention has been described in conjunction with detecting the presence or absence of a liquid material, it will be understood that the term "liquid" can refer to any material (whether fluent or solid) that, when in contact with the optical probe, causes a measurable change in light intensity as detected by the photosensor. It will be understood, therefore, that this invention is not limited to the particular embodiments disclosed, but it is intended to cover modifications within the spirit and scope of the present invention as defined by the appended claims.

I claim:

1. An optical probe for a liquid level transducer, the optical probe comprising:

an elongate, transparent body having a central elongate axis, a first end for receiving radiant energy from a light source and a second end adapted for exposure to a liquid to be measured;

the second end having first and second measurement surfaces that intersect at a transverse edge; the transverse edge extending at an acute angle with respect to the central axis and terminating at a probe tip that is spaced from the central elongate axis;

whereby liquid droplets that may be present on the probe are directed along the transverse edge toward the probe tip for expulsion therefrom.

2. An optical probe according to claim 1, wherein the transverse edge extends between opposite sides of the transparent body.

3. An optical probe according to claim 2, wherein the transparent body is cylindrical in shape.

4. An optical probe according to claim 3, wherein the probe tip is pointed.

5. An optical probe according to claim 1, wherein the transparent body has a first surface energy, and further comprising a film that covers at least a portion of the transparent body, the film having a second surface energy that is lower than the first surface energy to thereby encourage expulsion of liquid droplets from the transparent body.

6. An optical probe according to claim 5, wherein a refractive index of the probe body is greater than a refractive index of the film to thereby enhance detection of the presence and absence of liquid on the optical probe.

7. An optical probe according to claim 1, wherein the transparent body has a first refractive index, and further comprising a film that covers at least a portion of the transparent body, the film having a second refractive index that is lower than the first refractive index to thereby enhance detection of the presence and absence of liquid on the optical probe.

8. An optical transducer for determining the presence or absence of liquid in a reservoir, comprising:
   a housing having a hollow interior;
   an optical probe extending through the housing, the optical probe having a central elongate axis, a proximal end positioned in the hollow interior and a distal end positioned outside of the housing, the distal end having first and second measurement surfaces that intersect at a transverse edge, the transverse edge extending at an acute angle with respect to the central axis and terminating at a probe tip that is spaced from the central elongate axis;
   a light source arranged for projecting radiant energy into the optical probe toward the distal end; and
   a photosensor arranged for detecting radiant energy reflected from the distal end to thereby detect the presence and absence of liquid on the optical probe.

9. An optical transducer according to claim 8, wherein the transverse edge extends between opposite sides of the optical probe.

10. An optical transducer according to claim 9, wherein the outer surface of the optical probe is curved.

11. An optical transducer according to claim 10, wherein the probe tip is pointed.

12. An optical transducer according to claim 8, wherein the optical probe has a first surface energy, and further comprising a film that covers at least a portion of the optical probe, the film having a second surface energy that is lower than the first surface energy to thereby encourage expulsion of liquid droplets from the optical probe.

13. An optical transducer according to claim 12, wherein a refractive index of the optical probe is greater than a refractive index of the film to thereby enhance detection of the presence and absence of liquid on the optical probe.

14. An optical transducer according to claim 8, wherein the optical probe has a first refractive index, and further comprising a film that covers at least a portion of the optical probe, the film having a second refractive index that is lower than the first refractive index to thereby enhance detection of the presence and absence of liquid on the optical probe.

15. An optical transducer according to claim 8, wherein the housing comprises a mounting section with external threads for engagement with internal threads of a reservoir, and further wherein the light source and photosensor are located in the hollow interior above the mounting section to thereby minimize heat transfer between liquid being detected in the reservoir and the light source and photosensor.

16. An optical transducer according to claim 15, wherein the first and second measurement surfaces are located below the mounting section.

17. An optical transducer according to claim 16, wherein the light source and photosensor are flush with the proximal end of the optical probe.

18. An optical transducer for determining the presence or absence of liquid in a reservoir, the optical transducer comprising:
   a housing having a hollow interior and a mounting section for connection to a reservoir;
   an optical probe extending through the housing with a proximal end of the optical probe being positioned in the hollow interior above the mounting section and a distal end of the optical probe being positioned outside of the housing below the mounting section, the distal end including at least one measurement surface that terminates at a probe tip, the probe tip being spaced from a central axis of the optical probe;
   a light source positioned in the hollow interior for projecting radiant energy into the optical probe toward the distal end; and
   a photosensor positioned in the hollow interior for detecting radiant energy reflected from the distal end to thereby detect the presence and absence of liquid on the optical probe.

19. An optical transducer according to claim 18, wherein an inner surface of the housing above the mounting section and an outer surface of the optical probe form a continuous gap to thereby minimize heat transfer between the housing and the proximal end of the optical probe.

20. An optical transducer according to claim 18, wherein the at least one measurement surface of the optical probe comprises first and second measurement surfaces that intersect at a transverse edge, the transverse edge extending at an acute angle with respect to the central axis.

21. An optical transducer according to claim 20, wherein a distal end of the transverse edge is offset from the central axis.

22. An optical transducer according to claim 21, wherein the transverse edge extends to an outer surface of the optical probe.

23. An optical transducer according to claim 20, wherein the mounting section has external threads for engagement with internal threads of the reservoir.

* * * * *